United States Patent [19]
Hozuka et al.

[11] Patent Number: 6,067,009
[45] Date of Patent: May 23, 2000

[54] DIAGNOSTIC METHOD AND APPARATUS FOR VEHICLE HAVING COMMUNICATION DISABLING FUNCTION AT ENGINE STARTING

[75] Inventors: Minoru Hozuka, Okazaki; Atsushi Ohtake, Nishio, both of Japan

[73] Assignee: Denso Corporation, Kariya, Japan

[21] Appl. No.: 09/207,653

[22] Filed: Dec. 9, 1998

[30] Foreign Application Priority Data

Jan. 19, 1998 [JP] Japan .................................. 10-008069

[51] Int. Cl.$^7$ ...................................................... B60Q 1/00
[52] U.S. Cl. ............................. 340/459; 701/29; 701/30; 701/31; 340/438; 340/425.5; 340/439; 340/539
[58] Field of Search ................................ 340/438, 425.5, 340/439, 539, 989; 701/29, 30, 31, 35, 33; 364/436, 443, 424.03

[56] References Cited

U.S. PATENT DOCUMENTS

| | | | |
|---|---|---|---|
| 5,157,610 | 10/1992 | Asano et al. ...................... | 364/424.03 |
| 5,729,452 | 3/1998 | Smith et al. ....................... | 364/424.03 |
| 5,908,455 | 6/1999 | Parvahan ................................ | 701/29 |
| 5,941,918 | 7/1997 | Blosser ................................... | 701/29 |

FOREIGN PATENT DOCUMENTS 5-332888  12/1993  Japan .

*Primary Examiner*—Jeffery A. Hofsass
*Assistant Examiner*—Hung Nguyen
*Attorney, Agent, or Firm*—Nixon & Vanderhye, P.C.

[57] ABSTRACT

In a diagnostic method and apparatus for a vehicle, a transponder for performing a communication with an external receiver and an engine ECU are connected on a communication line. During a first inappropriate period in which noises are supposed to occur on the communication line due to engine starting or a second inappropriate period in which a processing load necessary for a control is supposed to be high when the engine speed is high or a load is high, even if there is a request for outputting abnormality information from the transponder, the engine ECU does not respond to the request. On the other hand, when it is not during the first and second inappropriate periods, the ECU responds to the output request from the transponder.

14 Claims, 11 Drawing Sheets

DIAGNOSTIC METHOD AND APPARATUS FOR VEHICLE HAVING COMMUNICATION DISABLING FUNCTION AT ENGINE STARTING

CROSS REFERENCE TO RELATED APPLICATION

This application relates to and incorporates herein by reference Japanese patent Application No. 10-8069, filed on Jan. 19, 1998.

BACKGROUND OF THE INVENTION

1. Field of the Invention

The present invention relates to a diagnostic method and apparatus for a vehicle for diagnosing the conditions of various component parts mounted on a vehicle and, more particularly, to a diagnostic apparatus for a vehicle which can transmit diagnosis results to a management center on the outside.

2. Related Art

Maintenance of a vehicle is controlled in such a manner that, for example, in Japan, the user asks a maintenance shop to inspect and repair a vehicle in accordance with a vehicle inspection of every predetermined period and reports the result to the district land transport bureau. In U.S.A., the user asks a maintenance shop to inspect and repair a vehicle in accordance with a periodic notification from the competent bureau and sends the result indicating that the requirements are satisfied to the competent bureau.

In such methods, a vehicle having no trouble and defect which requires no maintenance is uniformly managed. Consequently, the man-hour of the management in the competent bureau (the district land transport bureau) is long and it is also troublesome for the user.

It is therefore considered that information regarding the inspection (for instance, information regarding an abnormal engine-related parts) on the vehicle side is transmitted from the vehicle to the competent bureau by radio communication and the competent bureau instructs the user of the vehicle which requires a repair to report.

In case of constructing such a system, it is necessary to construct that the vehicle side is equipped with an apparatus for transferring and receiving information by radio (transponder) and information regarding an inspection is obtained by a control unit mounted on the vehicle and is sent from the control unit to the transponder.

When the transponder which has received a transmission request from the competent bureau side sends a request to output the information regarding the inspection to the control unit, however, if the request timing is at the same time with engine starting time, the communication state at that time is busy. There is consequently the possibility that noises occur on a communication line between the transponder and the control unit, for example, a signal which is inputted to the transponder is likely to differ from a signal generated from the control unit and erroneous information is likely to be sent to the competent bureau. When a microcomputer of the control unit is busy, for example, in case of an engine control unit, if an output data amount to the transponder increases when the engine speed is high or a load is high (in the case where the control unit detects and stores an abnormality), it is likely that an inherent control process is influenced.

Even when the control unit does not respond to the output request from the transponder but the control unit itself requests to output a diagnostic result, for example, at a predetermined timing of outputting the diagnostic result, the above inconvenience at the engine starting time and the busy time of the microcomputer of the control unit similarly occurs.

SUMMARY OF THE INVENTION

It is therefore an object of the invention to provide a diagnostic method and apparatus for a vehicle, which detects an inappropriate period for outputting a diagnostic result to a communication unit in response to an output request and does not respond to the output request during the period.

According to the present invention, a control unit for controlling various devices mounted on a vehicle diagnoses the conditions of the various devices and the result of the diagnosis is transmitted to a management center on the outside by a communication unit connected to the control unit via a communication line. On such a condition, the control unit detects at least one of a first inappropriate period during which noises are supposed to occur on the communication line due to engine starting and a second inappropriate period during which a processing load required to control the various devices is supposed to be equal to or larger than a predetermined value. When the inappropriate period is recognized, even if there is a request to output the diagnosis result to the communication unit, the request is not responded. On the other hand, when it is not during the inappropriate period, the diagnosis result is outputted to the communication unit in response to the output request of the diagnosis result.

During the first inappropriate period, the possibility, that noises occur on the communication line due to engine starting, for example, by rotation of a starter, is high. Consequently, when the diagnosis result is outputted from the control unit to the communication unit in such a state, data may become changed or destroyed on the communication line between the units. Thus, there is the possibility that an erroneous diagnosis result different from the actual result outputted from the control unit is transmitted to the management center. Even if there is a request for outputting the diagnosis result to the communication unit in the inappropriate period, the request is not therefore responded.

The second inappropriate period is a period in which a processing load required to control the various devices is equal to or larger than a predetermined value. The control of the various devices is the inherent task of the control unit and the priority is relatively high. On the other hand, the output of the diagnosis result has a relatively low priority. That is, in a period where the control unit is busy in executing the process having a high priority (that is, the processing load on the microcomputer is high), it is unnecessary to execute the process having the low priority of outputting the diagnosis result prior to the process having the high priority. Even if there is the request for outputting the diagnosis result to the communication unit in such a period, the request is not therefore responded. Specifically, the state in which the processing load is high denotes a state in which the object to be controlled is the engine and the engine speed is high. That is, when the processing timing corresponding to the engine speed is set, a processing volume per unit time increases in the state where the engine speed is high. Especially, a real-time process is required by the engine and the process which is not so urgent such as the outputting of the diagnosis result can be postponed.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
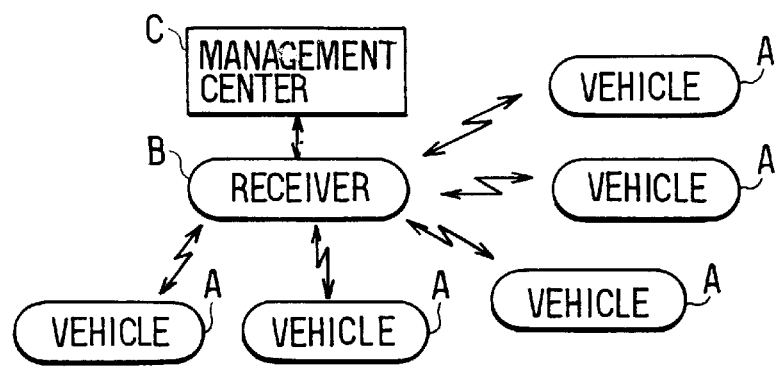
FIG. 1 is a schematic diagram of a diagnostic system including a vehicle according to a first embodiment of the present invention.

In FIG. 1 showing a diagnostic system including a vehicle on which a diagnostic apparatus f or a vehicle is mounted, a management center C serving as a competent bureau obtains data related to emission (exhaust gas), data regarding a failure in an engine, and the like from each of a plurality of vehicles A via a receiver B by radio communication. The management center C specifies a vehicle A having a malfunction and demands the owner of the vehicle to repair or improve the vehicle A. Various methods such as mailing of a document can be used to demand the repair or improvement of the vehicle A.

Figure 2:
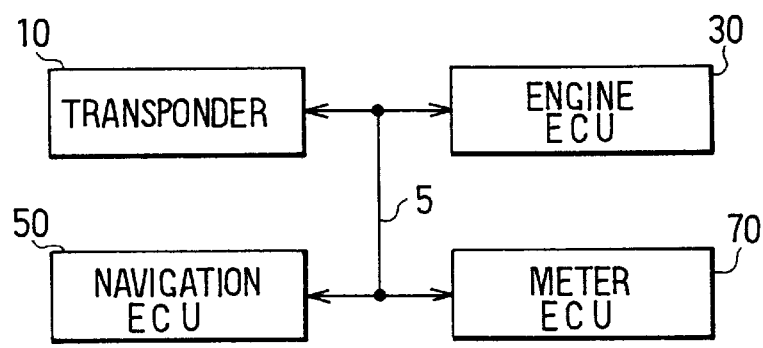
FIG. 2 is a block diagram showing a schematic system construction of the vehicle in the first embodiment.

In FIG. 2 showing the system construction in each vehicle A having a plurality of ECUs (electronic control units), a transponder 10 receives a request from the receiver B, obtains necessary information via a communication line 5 from an engine ECU 30, a navigation ECU 50, and a meter ECU 70 as control units mounted on the vehicle and transmits the obtained information to the receiver B (FIG. 1).

The engine ECU 30 controls the engine, self-diagnoses an abnormality relating to emission of the engine, and transmits the information to the transponder 10 in response to a request from the transponder 10.

The navigation ECU 50 and the meter ECU 70 carry out a navigation control and a meter display control, respectively. When the engine ECU 30 detects an abnormality by the self diagnosis, the navigation ECU 50 and the meter ECU 70 output a travel distance of the vehicle and the position of the vehicle to the engine ECU 30 in response to requests sent from the engine ECU 30, respectively. When requests from the transponder 10 are received, the ECUs 50 and 70 output the travel distance and the vehicle position at that time to the transponder 10.

Figure 3:
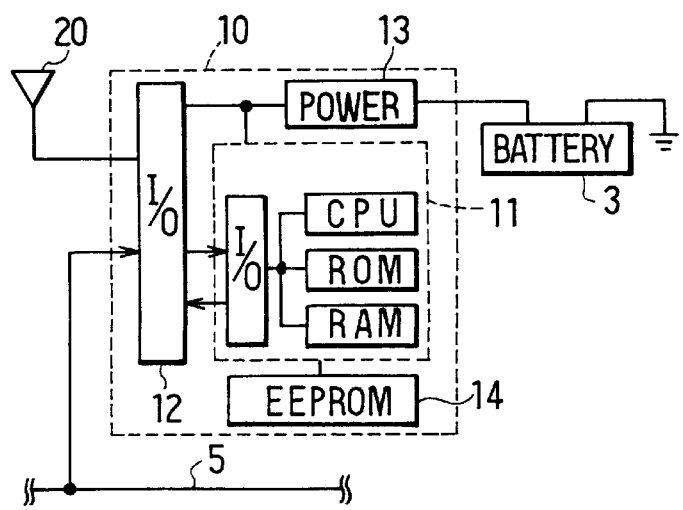
FIG. 3 is a block diagram showing the construction of a transponder in the first embodiment.

In FIG. 3, since electric power is always supplied from a battery 3 to a power circuit 13 for supplying electric power to operate the transponder 10, the transponder 10 operates irrespective of the state of a key switch of the vehicle. A CPU in a microcomputer 11 executes a process in response to a request sent from the outside via an antenna 20 in accordance with a control program stored in a ROM in the microcomputer 11. A RAM in the microcomputer 11 temporarily stores data and the like sent from the engine ECU 30 and so on. An input/output circuit 12 is connected to the antenna 20 and the communication line 5 and data inputted and outputted via the input/output circuit 12 is received and transmitted from/to the CPU and the like via an I/O device in the microcomputer 11. An EEPROM 14 is also connected to the microcomputer 11 and stores an identification number (VIN code) specific to the vehicle.

Figure 4:
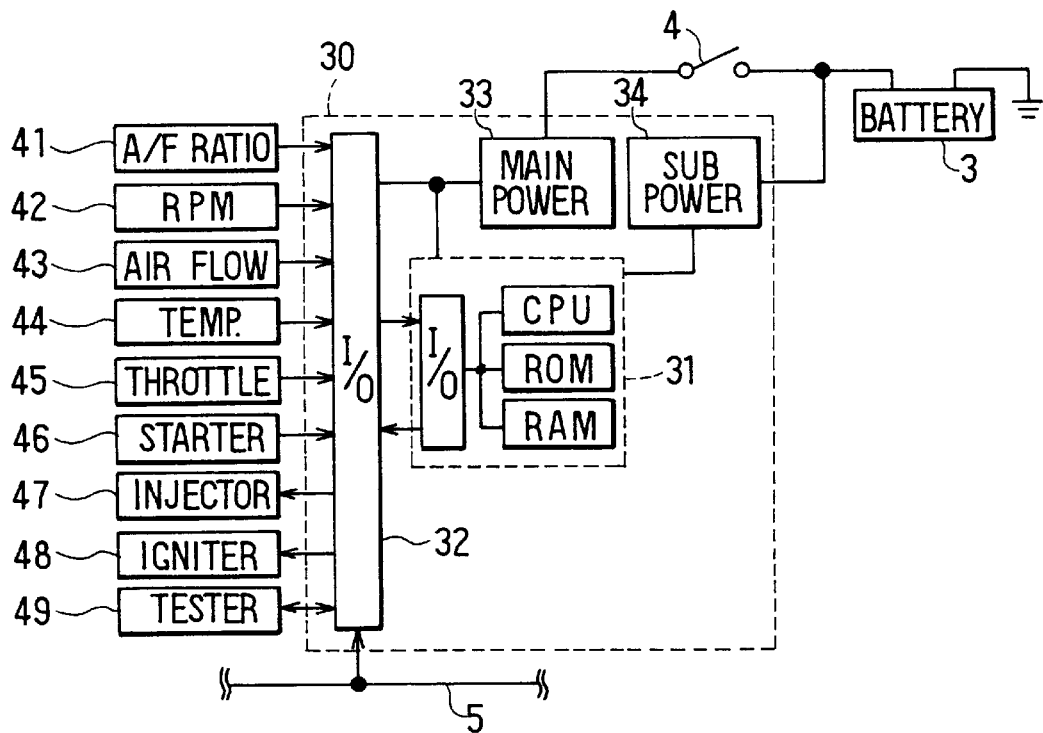
FIG. 4 is a block diagram showing the construction of an engine ECU in the first embodiment.

As shown in FIG. 4, a main power circuit 33 is connected to the battery 3 via an ignition switch 4. Basically, by turning on the ignition switch 4, the power is supplied from the main power circuit 33 to operate the engine ECU 30. A power is also supplied from a sub power circuit 34 which is directly connected to the battery 3 not through the ignition switch 4, so that data in the RAM in the microcomputer 31 is held after turn-off of the ignition switch 4.

In the microcomputer 31, according to the control program stored in the ROM, the CPU generates signals for controlling an injector 47 and an igniter 48 so that the engine operates optimally on the basis of sensor signals inputted via the input/output circuit 32 and the I/O device in the microcomputer 31. The microcomputer 31 performs self-diagnosis for an abnormality relating to the emission of the engine, diagnoses the operation of the engine, and detects an abnormality or the like of sensors 41 to 46. Data as the result of diagnosis is outputted in response to a request from the outside (a DIAG tester 49 or the transponder 10). The RAM in the microcomputer 31 stores sensor data used for an arithmetic operation in the CPU, control data obtained by the arithmetic operation, various diagnostic data derived by the diagnosis, and the like.

The sensors 41 to 46 connected to the input/output circuit 32 are the air-fuel ratio (A/F) sensor 41, rotation speed (RPM) sensor 42 for sensing the rotations of the engine, air flow meter 43, water temperature sensor 44, throttle sensor 45, and starter switch 46.

Figure 5:
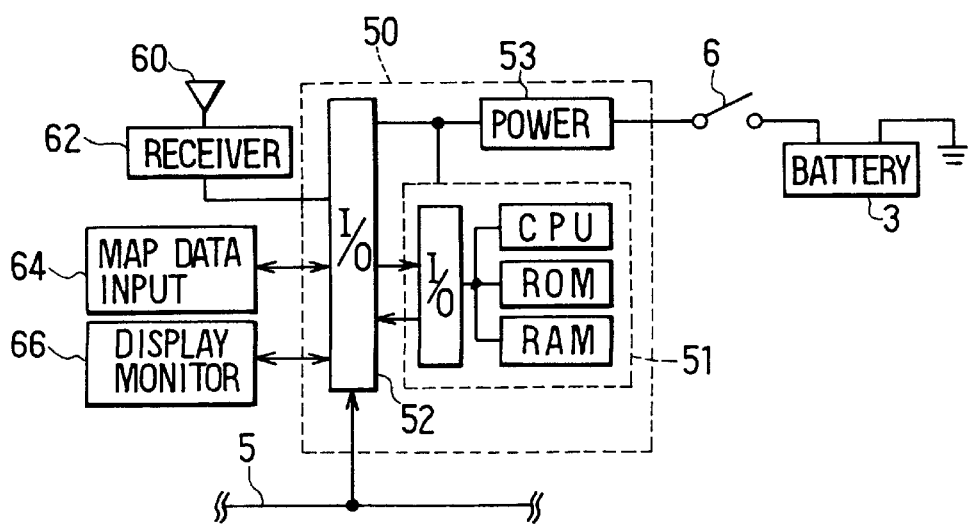
FIG. 5 is a block diagram showing the construction of a navigation ECU in the first embodiment.

In the navigation ECU 50 shown in FIG. 5, a power circuit 53 is connected to the battery 3 via an accessory switch 6 and a microcomputer 51 and an input/output circuit 52 operate when the accessory switch 6 is turned on. A receiver 62, a map data inputting device 64, and a display monitor 66 are connected to the input/output circuit 52. A GPS antenna 60 is connected to the receiver 62. Those components construct a GPS (Global Positioning System) for detecting the position of the vehicle on the basis of electromagnetic radio waves from a GPS satellite. The map data inputting device 64 is a device for inputting various data including map matching data to improve the accuracy of position detection and map data from a storage medium. As a storage medium for this purpose, although it is typical to use a CD-ROM because of a large data amount, other media such as DVD and memory card can be also used. The display monitor 66 is used to display a map, a guiding path, and the like. In the embodiment, the display monitor 66 also has the function of inputting an instruction from the user.

In the microcomputer 51, in accordance with the control program stored in the ROM, the CPU executes a displaying process in response to instruction information from the user obtained by the display monitor 66 on the basis of map data from the map data inputting device 64 and a signal from the receiver 62 inputted via the input/output circuit 52 and the I/O device in the microcomputer 51 and allows the display monitor 66 to display desired information of the user. When a request from the engine ECU 30 or the transponder 10 is received via the communication line 5, the microcomputer 51 can output the vehicle position upon receipt of the request to the engine ECU 30 or transponder 10 which sent the request.

Figure 6:
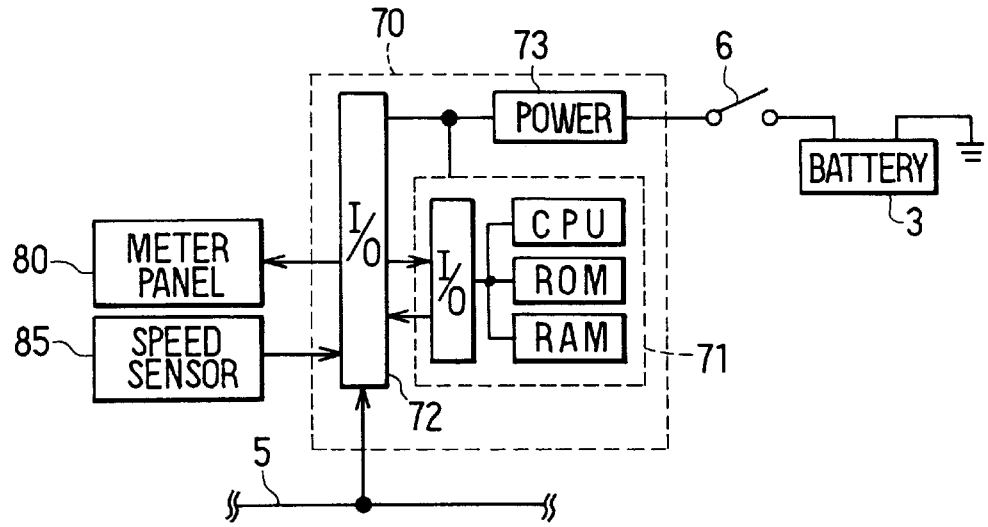
FIG. 6 is a block diagram showing the construction of a meter ECU in the first embodiment.

As shown in FIG. 6, in the meter ECU 70, a power circuit 73 is connected to the battery 3 via the accessory switch 6. When the accessory switch 6 is turned on, a microcomputer 71 and an input/output circuit 72 operate. A meter panel 80, a vehicle speed sensor 85, and the like are connected to the input/output circuit 72.

In the microcomputer 71, in accordance with the control program stored in the ROM, the CPU receives a sensor signal from the speed sensor 85 and the like and allows the meter panel 80 to display information such as the speed of the vehicle. When a request from the engine ECU 30 or the transponder 10 is sent via the communication line 5, the microcomputer 71 can output a cumulative travel distance of the vehicle upon receipt of the request to the engine ECU 30 or transponder 10 which sent the request.

Processes carried out by the engine ECU 30 will be described with reference to FIGS. 7 to 11.

Figure 7:
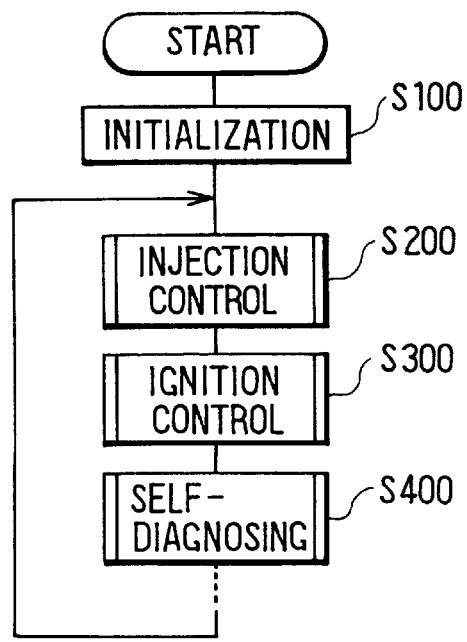
FIG. 7 is a flowchart showing a main process executed by the engine ECU in the first embodiment.

First, when the engine ECU 30 starts to operate by turn-on of the ignition switch 4 (FIG. 4), as shown in the first step S100 of the main process of FIG. 7, detection data, counter data, and the like in the RAM is initialized. Data stored relating to a self-diagnosing process (S400) which will be described hereinlater is not an object of the initialization.

After the initializing process of step S100, a fuel injection (EFI) in S200, an ignition timing (ESA) control process in S300, the self-diagnosing process related to the engine in S400, and other processes are repeatedly performed.

The diagnosing process at step S400 will be described in detail with reference to FIGS. 8 and 9.

Figure 8:
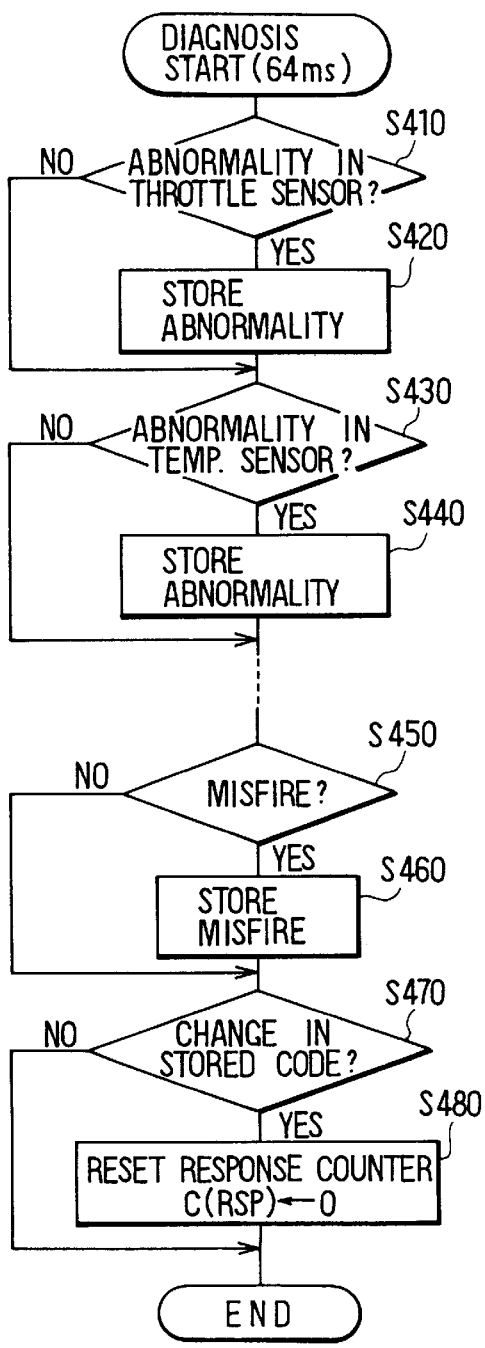
FIG. 8 is a flowchart showing a diagnostic process executed by the engine ECU in the first embodiment.

The diagnosing process shown in FIG. 8 is a base process executed, for instance, every 64 m/sec. Whether the throttle sensor 45 and the water temperature sensor 44 (FIG. 4) are abnormal or not is discriminated (S410 and S430). When an abnormality is detected (YES in S410 or YES in S430), a code for specifying the detected abnormal object is stored in the RAM (S420 and S440). Whether a misfire of the engine is detected or not is decided (S450). If a misfire is detected (YES in S450), a misfire code is stored in the RAM (S460).

Although not shown in FIG. 8, it is also possible to discriminate a defective state of engine related parts such as the injector 47 or a catalyst and store a code specifying the detected abnormal object into the RAM when an abnormality is detected.

In order to discriminate whether a new abnormality is stored in the processes or not, the contents of the stored code are checked to determine if there is a change (S470). When there is a change (YES at step S470), a response number counter C (RSP) used in a communicating process with the transponder 10 which will be described hereinlater is reset to "0" (S480). The response number counter C (RSP) is also reset to "0" in the initializing process shown at step S100 in FIG. 7.

Figure 9:
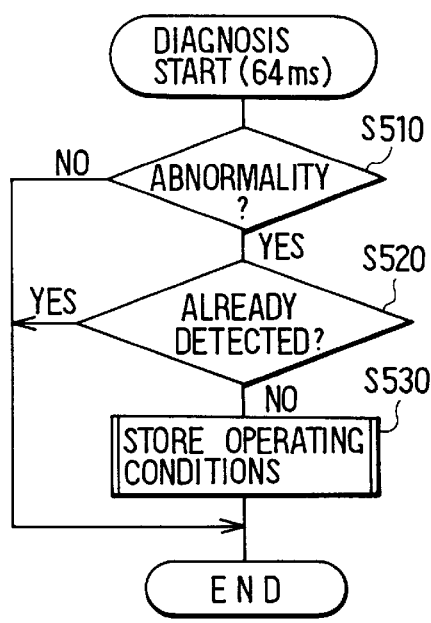
FIG. 9 is a flowchart showing a diagnostic process executed by the engine ECU in the first embodiment.

The diagnosing process shown in FIG. 9 is also a base process executed, for example, every 64 m/sec. In the first step S510, whether an abnormality is detected in the diagnosing process of FIG. 8 or not is decided. Specifically, when YES is determined at steps S410, S430, and S450, it is determined that there is an abnormality.

If there is no abnormality (NO in S510), the processing routine is finished at once. When there is an abnormality (YES in S510), whether it is the abnormality which has been already detected or not is discriminated (S520). That is, when the detected abnormality is the abnormality which has been detected before (YES in S520), the processing routine is finished immediately. On the other hand, when it is the abnormality which is detected for the first time, namely, when the abnormality code has not been stored in the RAM (NO in S520), the routine advances to S530 and the operating conditions are stored.

The data (freeze frame data) of the operating conditions stored at step S530 is used for analyzing the abnormality when a vehicle is diagnosed and is a part of data sent from the transponder 10 to the management center C side (FIG. 1) via the receiver B. Items to be stored are control data relating to the engine speed, an intake air volume, a water temperature, a throttle opening angle, and an injection amount, control data relating to an ignition timing, a travel distance of the vehicle, the position of the vehicle, and the like. Among the items, the travel distance and the position of the vehicle are obtained in such a manner that the engine ECU 30 sends requests to the meter ECU 70 and the navigation ECU 50 via the communication line 5, a cumulative travel distance at that time point is outputted from the meter ECU 70 and the position at that time point is outputted from the navigation ECU 50.

In the engine ECU 30, as described above, the process regarding the diagnosis is executed and the presence or absence of abnormality, the contents of the abnormality, and the operating conditions at the time of occurrence of an abnormality are stored. Further, if there is a request from the transponder 10 via the communication line 5, a process for outputting information of the abnormality to the transponder 10 is executed.

A responding process to the request from the transponder 10 will be described with reference to FIGS. 10 and 11.

Figure 10:
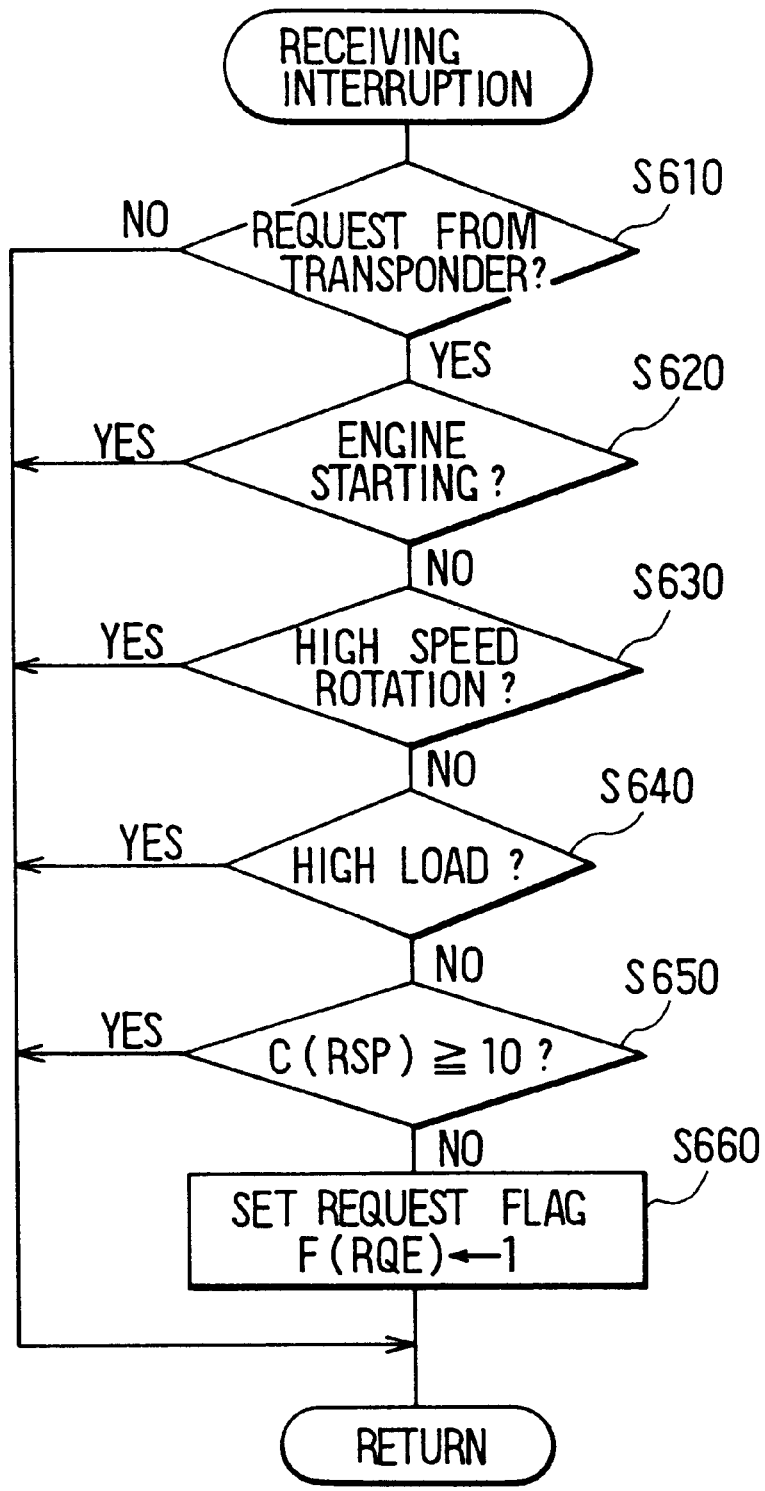
FIG. 10 is a flowchart showing a responding process executed in a receiving interruption by the engine ECU in the first embodiment.

The responding process shown in FIG. 10 is a process executed by a receiving interruption. First, whether the request is from the transponder 10 or not is determined (step S610). If the request is from the transponder 10 (YES in S610), whether the engine starting time or not (S620), whether the engine high rotation time or not (S630), and whether the engine high load time or not, that is, the throttle opening angle is equal to or larger than a predetermined angle or not (S640) are checked one by one. If it is determines as NO, the routine advances to the next step.

When it is determined as YES in any one of the above steps, that is, when it is the engine starting time (YES in S620), the engine high rotation state in which the operation of the microcomputer 31 is busy (YES in S630), or the high load state (YES in S640), the request from the transponder 10 is ignored and the processing routine is finished. On the other hand, it is determined as NO in all of the steps, the routine advances to the following step S650.

In S650, whether the response number counter C (RSP) is equal to or greater than 10 is checked. If the response number counter C (RSP) is not equal to or greater than 10 (YES in S650), an output request flag F (RQE) is set to "1" (S660). After that, the responding process routine by the receiving interruption is finished. The response number counter C (RSP) is a counter for counting the number of responses to the transponder 10. When a request is frequently sent from the transponder 10 due to an abnormality in the transponder 10 or the like, the responding number counter C (RSP) is used to cancel the frequent requests.

Figure 11:
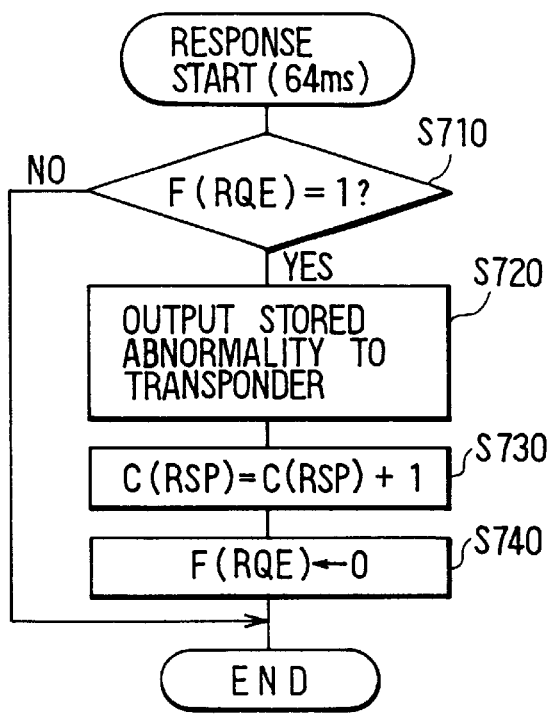
FIG. 11 is a flowchart showing a responding process executed as a base process by the engine ECU in the first embodiment.
Figure 12:
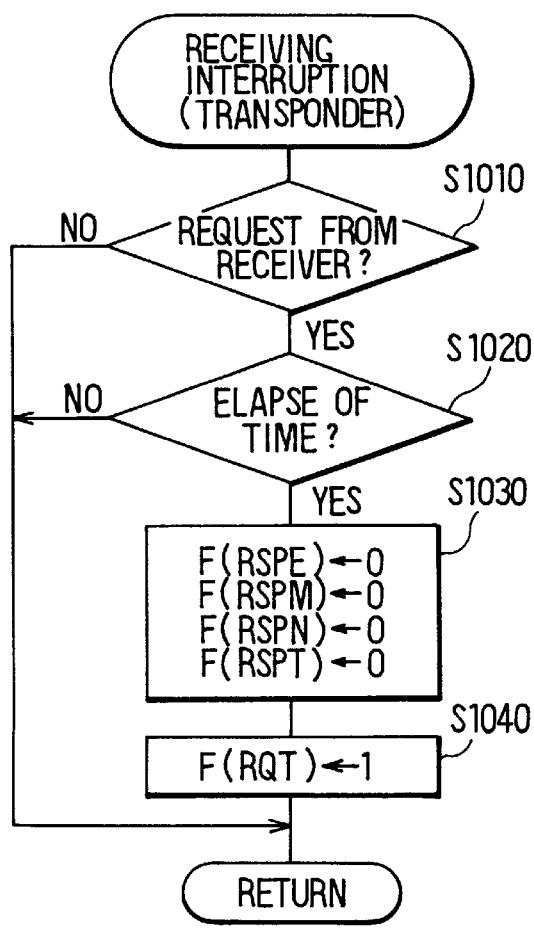
FIG. 12 is a flowchart showing a process performed in a receiving interruption by the transponder in the first embodiment.

On the other hand, the responding process shown in FIG. 11 is a base process executed, for instance, every 64 m/sec. In the first step S710, whether the output request flag F (RQE) is set or not is confirmed. When the output request flag F (RQE) is set (YES in S710), stored abnormality information (the presence or absence of abnormality, the code of the abnormal object if there is an abnormality, and the data of operating conditions when the abnormality is detected) is outputted to the transponder 10 (S720). Consequently, within 64 m/sec at the latest since the output request flag F (RQE) is set at step S660 in the responding process (FIG. 10) by the receiving interruption, it is determined that the output request flag F (RQE) of the abnormality information is set.

By the operation, the communication in the environment where noises occur is avoided, erroneous data is prevented from being sent to the transponder 10, and it is also prevented that the control process is delayed due to data output of the abnormality information when the control process of the engine ECU 30 is busy. Especially, when the abnormality is detected and the amount of data is large, although a waiting time of another process in the outputting process becomes long, a regular control is not hindered. Since the output of the abnormality information is not so urgent, there is no problem if the output is delayed a little.

After outputting the abnormality information at step S720, the response number counter C (RSP) is counted up (S730), the output request flag F (RQE) is reset (S740), and the processing routine executed every 64 m/sec is finished. The response number counter C (RSP) is cleared at the time of initialization of the engine ECU 30 and also when any abnormality is detected. The response number counter C (RSP) is counted up each time the abnormality information is outputted. When there is no change in the abnormality state, the information is outputted only up to ten times. Consequently, even if the transponder 10 is abnormal and sends the output request frequently, no influence is exerted on the engine ECU 30.

The processes executed by the transponder 10 will be described with reference to FIGS. 12 to 15.

In the first step S1010, whether the request is a transmission request of abnormality information sent from the receiver B (FIG. 1) or not is checked. If it is the transmission request of abnormality information (YES in S1010), whether a predetermined time has been elapsed from the previous response or not is confirmed (S1020). If the predetermined time has been elapsed (YES in S1020), the routine advances to S1030. In S1030, reception completion flags F(RSPE), F(RSPM), and F(RSPN) indicative of completion of reception of data from the ECUs 30, 50, and 70 and a transmission completion flag F(RSPT) are reset to "0". In the subsequent step S1040, the output request flag F(RQT) is set to "1" and the routine is finished.

If the predetermined time has not been elapsed since the previous response (NO in S1020), the processing routine is finished immediately. It is, however, presumed that the abnormality to be detected by the engine ECU 30 does not change rapidly, so that there is no problem even if a request is responded after elapse of a predetermined time since the previous response. With this arrangement, even if a request signal from the outside is frequently received, unnecessary communication with the ECUs 30, 50, and 70 can be reduced. As the predetermined time, for example, one hour, two hours, and the like can be set.

Figure 13:
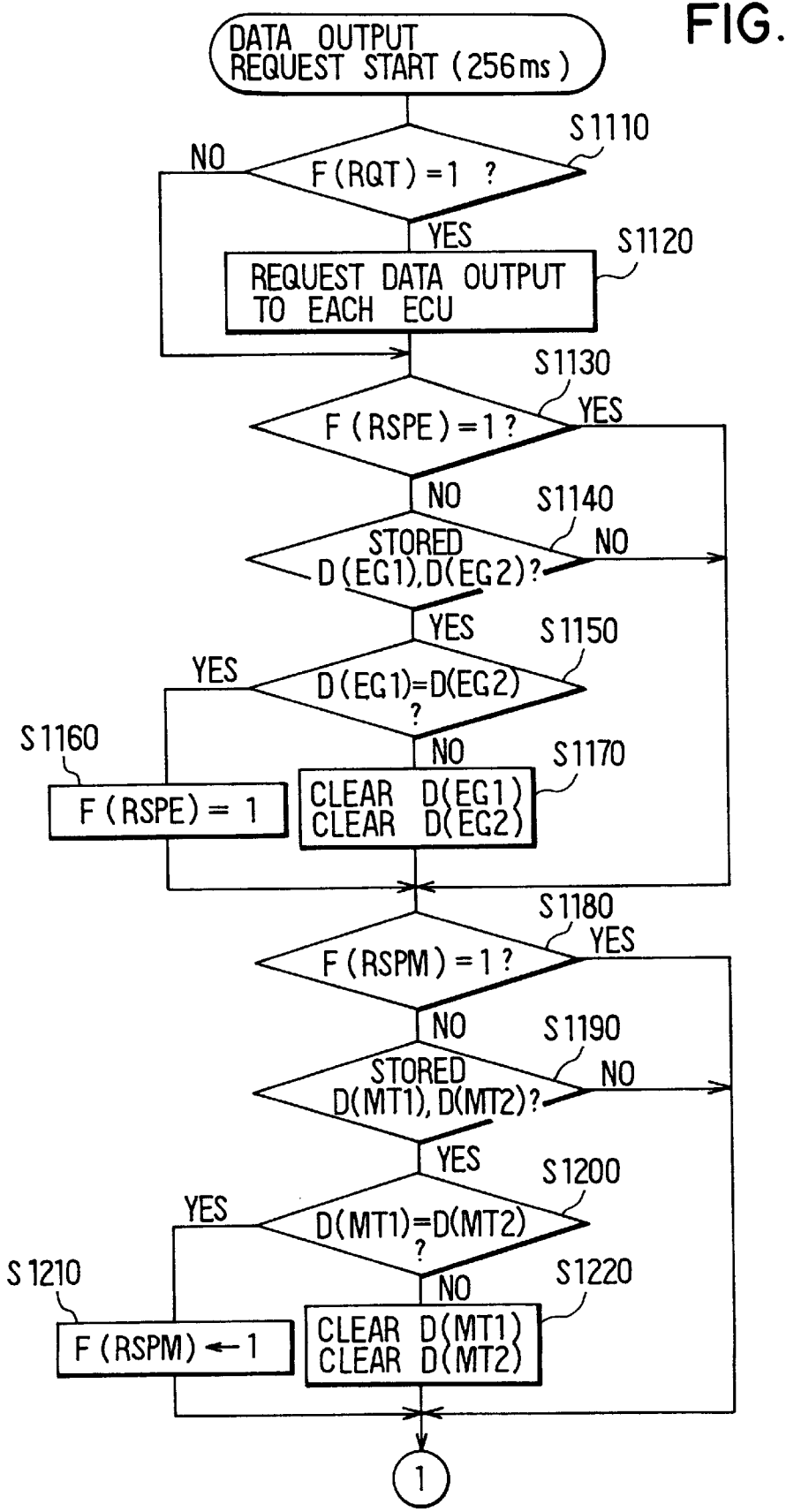
FIG. 13 is a flowchart showing the first half of an output request process executed by the transponder in the first embodiment.
Figure 14:
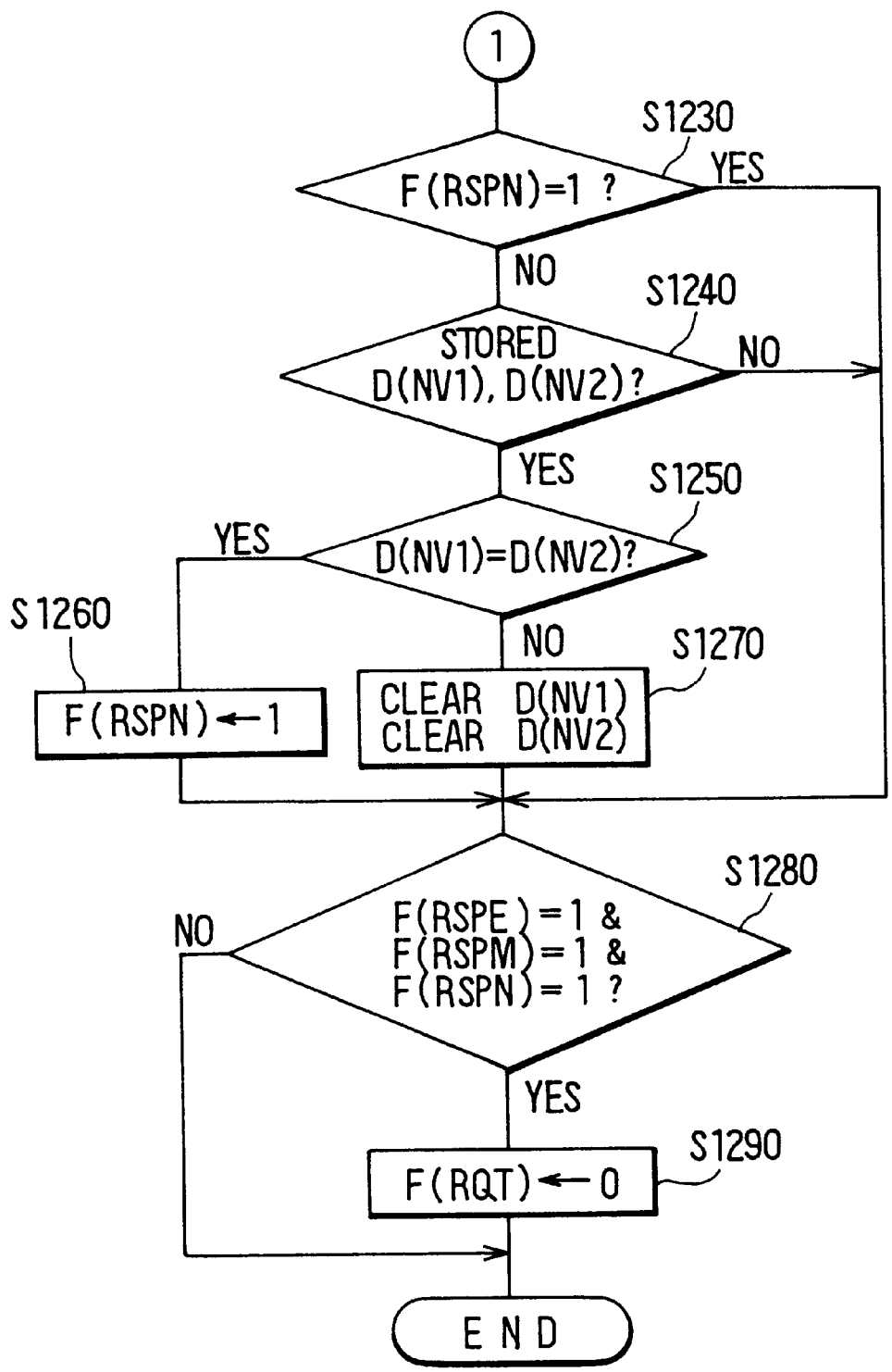
FIG. 14 is a flowchart showing the latter half of the output request process executed by the transponder in the first embodiment.

On the other hand, the output request process shown in FIGS. 13 and 14 is a base process executed, for instance, every 256 m/sec. In the first step S1110, whether the output request flag F(RQT) is set or not is checked. If the output request flag F(RQT) is set in S1040, S1110 is determined as YES. The processing routine advances to S1120 and a data output request is sent to each of the ECUs 30, 50, and 70.

Figure 15:
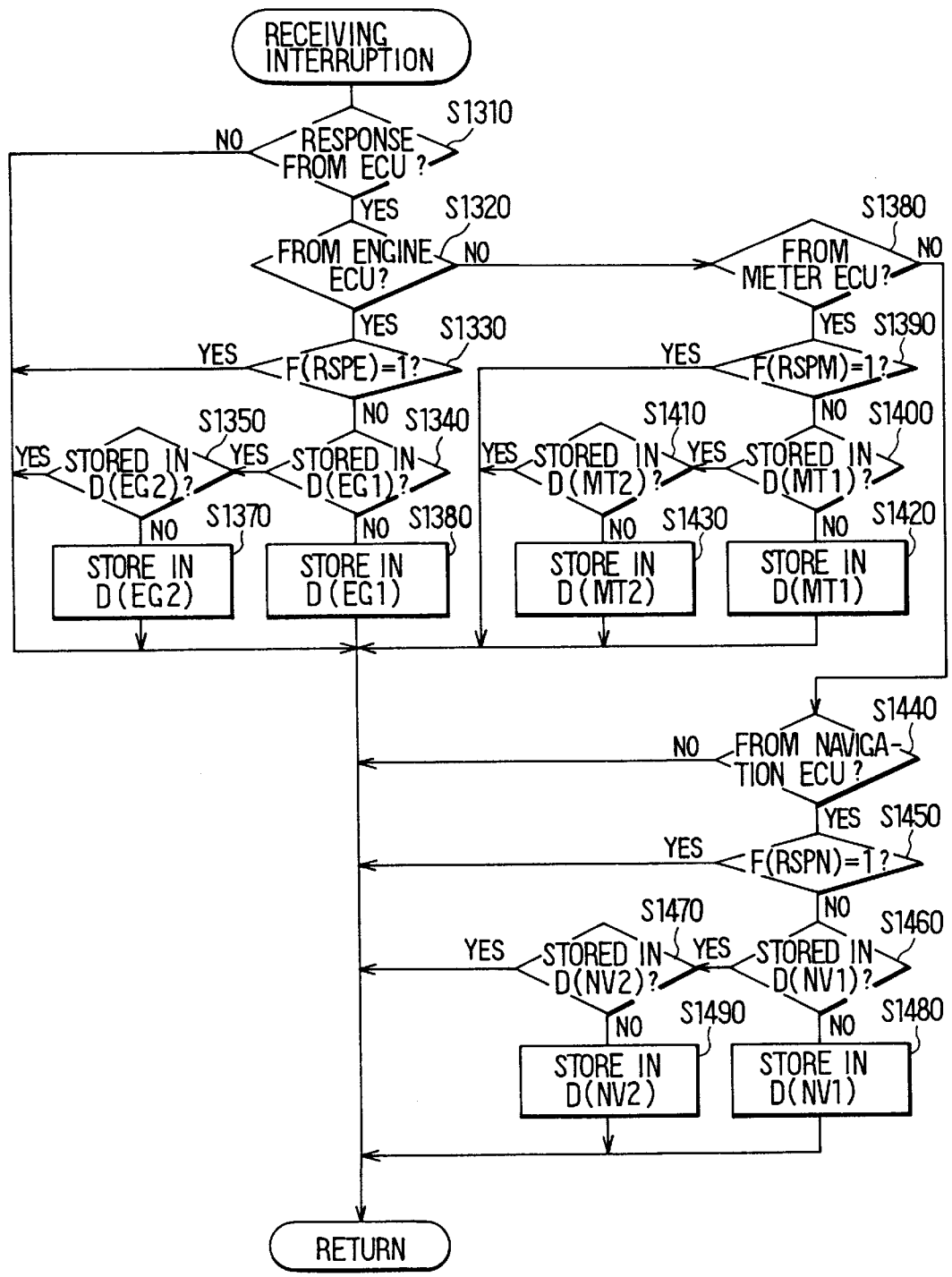
FIG. 15 is a flowchart showing a reception data storing process carried out in the receiving interruption by the transponder in the first embodiment.
Figure 16:
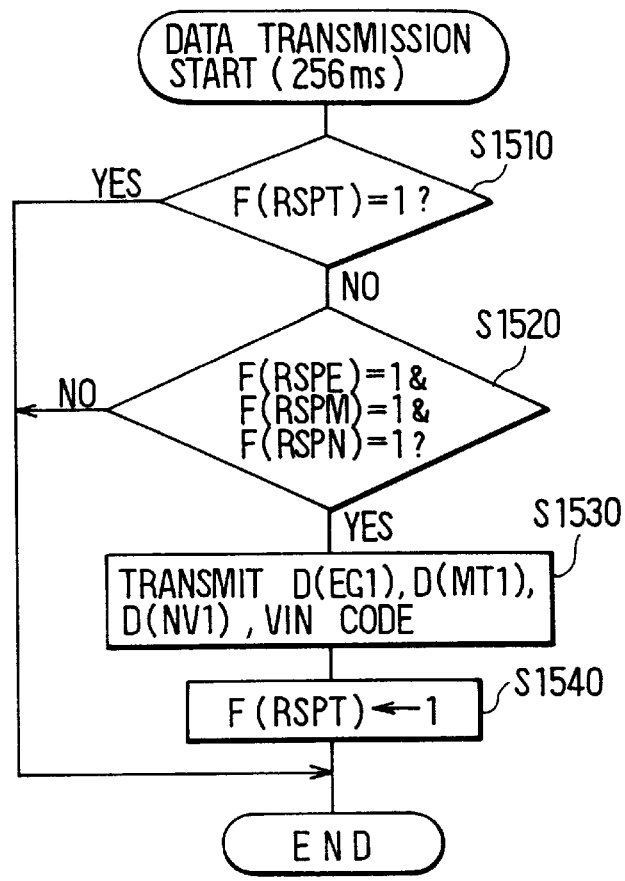
FIG. 16 is a flowchart showing a transmitting process to a receiver performed by the transponder in the first embodiment.

When there is a response from any of the ECUs 30, 50, and 70 to the output request, a reception data storing process shown in FIG. 15 is executed by a receiving interruption. The process of FIG. 15 will now be described.

In the first step S1310, whether the response is from the ECU or not is discriminated. If it is the response from the ECU (YES in S1310), the response is from which one of the engine ECU 30, navigation ECU 50, and meter ECU 70 is discriminated at steps S1320, S1380, and S1440.

When it is the response from the engine ECU 30 (YES in S1320), a check is made to see whether the reception completion flag F(RSPE) indicative of completion of data reception is "1" or not (S1330). If the reception completion flag F(RSPE) is not "1" (NO in S1330), the routine advances to S1340.

At step S1340, whether reception data D has been stored in a predetermined storing region D(EG1) in the RAM or not is discriminated. If the reception data D has not been stored (NO in S1340), the reception data D is stored into the storing region D(EG1) (step S1360). On the other hand, the reception data D has been already stored in the storing region D(EG1) (YES in S1340), whether reception data has been stored in another storing region D(EG2) or not is checked (S1350). If it has not been stored, the reception data is stored into the storing region D(EG2) (step S1370). In this manner, the reception data of twice is stored into the storing regions D(EG1) and D(EG2) in the RAM in accordance with the response from the engine ECU 30.

In the case where the response is from the meter ECU 70 (YES in S1380) as well, a process similar to that of S1320 to S1370 to the engine ECU 30 is carried out (S1390 to S1430). As a result, the reception data of twice is stored into storing regions D(MT1) and D(MT2) in the RAM in accordance with the response from the meter ECU 70.

In the case where the response is that from the navigation ECU 50 (YES in S1440) as well, a process similar to that of S1320 to S1370 to the engine ECU 30 is executed (S1450 to S1490). As a result, in accordance with the response from the navigation ECU 50, reception data of twice is stored into storing regions D(NV1) and D(NV2).

In this instance, the engine ECU 30 outputs information relating to the abnormality. The meter ECU 70 outputs the cumulative travel distance at the time point when the request is received from the transponder 10. The navigation ECU 50 generates a signal indicative of the vehicle position upon receipt of the request from the transponder 10. Consequently, since the vehicle position and the cumulative travel distance when the abnormality is detected and the vehicle position and the cumulative travel distance when the receiver B requested the vehicle to send the abnormality information are sent to the receiver B, the management center C to which the data is transferred from the receiver B recognize the travel distance and the movement state of the vehicle A after occurrence of the abnormality. The management center C can therefore take a proper action to the user of the vehicle A. The proper action is taken in such a manner that for example: a warning is notified; the engine is forcedly stopped via communication when the vehicle A is stopped in a safe place depending on the situation; when the engine is stopped by the user, the engine is not activated again; or the like.

The process of FIG. 15 relates to the reception data storing process which is executed when there is a response from the ECU 30, 50, or 70 to the output requests to the ECUs 30, 50, and 70 at step S1120 in FIG. 13.

In FIG. 13, at step S1130, whether the reception completion flag F(RSPE) indicative of completion of data reception from the engine ECU 30 is "1" or not is checked. When the reception completion flag F(RSPE) is not "1" (NO in S1130), whether reception data has been stored in the storing regions D(EG1) and D(EG2) in the RAM or not is checked in the following step S1140. If the data has been stored (YES at step S1140), whether the two data coincides with each other or not is tested. If the data coincides with each other (YES in S1150), after the reception completion flag F(RSPE) is set to "1" indicative of reception completion (S1160), the processing routine shifts to step S1180. When the two data does not coincide with each other (NO in S1150), both of the reception data stored in the storing regions D(EG1) and D(EG2) in the RAM is cleared (S1170) and the routine advances to step S1180.

When the reception completion flag F(RSPE) is "1" (YES in S1130), or when the reception data has not been stored in the storing regions D(EG1) and D(EG2) (NO in S1140), the routine advances to step S1180 immediately.

The steps from S1180 to S1220 relate to the process regarding the reception data from the meter ECU 70. The contents of the process are similar to those of the above process of S1130 to S1170 regarding the reception data from the engine ECU 30. That is, when the reception completion flag F(RSPM) indicative of the reception completion from the meter ECU 70 is not "1" (NO in S1180), whether the reception data has been stored in the storing regions D(MT1) and D(MT2) or not is checked at the following step S1190. In the case where the reception data has been stored (YES in S1190), if the two data coincides with each other (YES in S1200), after setting the reception completion flag F(RSPM) to "1" (S1210), the program proceeds to step S1230. When the two data does not coincide with each other (NO in S1200), the reception data stored in the storing regions D(MT1) and D(MT2) is cleared (S1220) and the program proceeds to step S1230 shown in FIG. 14.

The steps from S1230 to S1270 relate to the process regarding the reception data from the navigation ECU 50. The contents of the process are similar to those of the above process of S1130 to S1170 regarding the reception data from the engine ECU 30. That is, when the reception completion flag F(RSPN) indicative of the reception completion from the navigation ECU 50 is not "1" (NO in S1230), whether the reception data has been stored in the storing regions D(NV1) and D(NV2) or not is checked in the following step S1240. In the case where the reception data has been stored (YES in S1240), if the two data coincides with each other (YES in S1250), after setting the reception completion flag F(RSPN) to "1" (S1260), the program proceeds to step S1280. When the two data does not coincide with each other (NO in S1250), the reception data stored in the storing regions D(NV1) and D(NV2) is cleared (S1270) and the program proceeds to step S1280.

At step S1280, whether all of the reception completion flags F(RSPE), F(RSPM), and F(RSPN) are set to "1" or not is checked. When they are set to "1" (YES in S1280), the output request flag F(RQT) is reset to "0" (S1290). That is, in the reception of data from the ECUs 30, 50, and 70, by the coincidence of the reception data of twice, it is determined that the data has been normally received through the communication line without being destroyed, thereby ensuring the reliability of the data.

If any of the reception completion flags F(RSPE), F(RSPM), or F(RSPN) is not set (NO in S1280), the processing routine is finished immediately, so that the output request flag F(RQT) remains to be set. Consequently, each time the output request processing routine shown in FIGS. 13 and 14 is repeated (every 256 m/sec), an output request is sent to each of the ECUs 30, 50, and 70. Even if the request from the transponder 10 is ignored in the ECUs 30, 50, and 70 on the other side in accordance with the engine conditions or the states of the ECUs 30, 50, and 70 on the other side, the request is repeatedly sent from the transponder 10 side until the data reception is completed. Consequently, the data can be surely obtained from the ECUs 30, 50, and 70.

The transmission process is a base process executed, for example, every 256 m/sec. First in the first step S1510, whether a transmission completion flag F(RSPT) indicative of completion of transmission to the receiver B is set to "1" or not is checked. If the transmission has not been completed (NO in S1510), in the following step S1520, whether all of the reception completion flags F(RSPE), F(RSPM), and F(RSPN) are set to "1" or not is checked. When all of the reception completion flags F(RSPE), F(RSPM), and F(RSPN) are set to "1" (YES in S1520), the reception data stored as diagnostic data in the storing regions D(EG1), D(MT1), and D(NV1) in the RAM is transmitted together with a VIN code stored in the EEPROM 14 (FIG. 3) to the receiver B. Further, the transmission completion flag F(RSPT) is set to "1" (S1540) and the processing routine is finished.

According to the vehicle diagnostic apparatus of the embodiment, the ECUs 30, 50, and 70 mounted on the vehicle A diagnose the states of the various devices which are controlled by the ECUs, respectively. The result of the diagnosis is transmitted to the receiver B on the outside by the transponder 10 connected via the communication line 5 and is further transferred to the management center C. In such a condition, for example, as shown in FIG. 10, even if there is a request to output abnormality information to the transponder 10, the engine ECU 30 does not respond to the request (YES in S620) during the first inappropriate period in which noises are expected to occur on the communication line 5 due to the engine starting and during the second inappropriate period (YES at steps S630 and S640) in which a processing load required for a control when the engine rotational speed is high or the load is high is expected to be high. On the other hand, when it is not in the first or second inappropriate period (NO in the steps S620 to S640), the output request flag F(RQE) is set to "1" (S660). "YES" is therefore determined in S710 in FIG. 11 and the abnormality information is outputted to the transponder 10 at step S720.

In the first inappropriate period, there is the high possibility that noises occur on the communication line 5 due to the engine starting, for example, by the rotation of a starter or the like. Consequently, when the abnormality information is outputted from the engine ECU 30 to the transponder 10 in such a state, data may become illegal or data destroy may occur on the communication line 5, so that there is the possibility that an erroneous diagnosis result different from the result outputted from the engine ECU 30 is transmitted to the management center C. Even if there is a request for outputting the diagnosis result to the transponder 10 in the period, the request is not responded.

In the second inappropriate period, a processing load required to control the various devices is equal to or larger than a predetermined value. For instance, as for the engine ECU 30, various controls to the engine are inherent tasks and the priority is relatively high. On the other hand, the output of the abnormality information has a relatively low priority. That is, during a period in which the engine ECU 30 is busy in executing the process having a high priority (that is, the processing load of the microcomputer 31 is high), it is unnecessary to execute the process having the low priority of outputting the abnormality information prior to the process having the high priority. Even if there is the request for outputting the diagnosis result to the transponder 10 in such a period, the request is not responded. That is, when the processing timing corresponding to the engine speed is set, a processing volume per unit time increases in the state where the engine speed is high. A real-time process is necessary, especially, for the engine and there is no problem that the process which is not so urgent such as the outputting of the diagnosis result is postponed.

Each of the ECUs 30, 50, and 70 outputs the abnormality information in response to the output request from the transponder 10. The output request from the transponder 10 to each of the ECUs 30, 50, and 70 is sent in response to the transmission request from the management center C side, specifically, the receiver B. In this manner, the transmission request can be sent at a convenient timing for the management in the management center C, so that there is an advantage for the management. On the other hand, when the transponder 10 sends the output request to each of the ECUs 30, 50, and 70 in accordance with the transmission request sent at the timing convenient to the management center C, the request timing is not always appropriate to the ECUs 30, 50, and 70. As mentioned above, therefore, the problem can be solved by not responding to the request during the first and second inappropriate periods.

Second Embodiment

Figure 17:
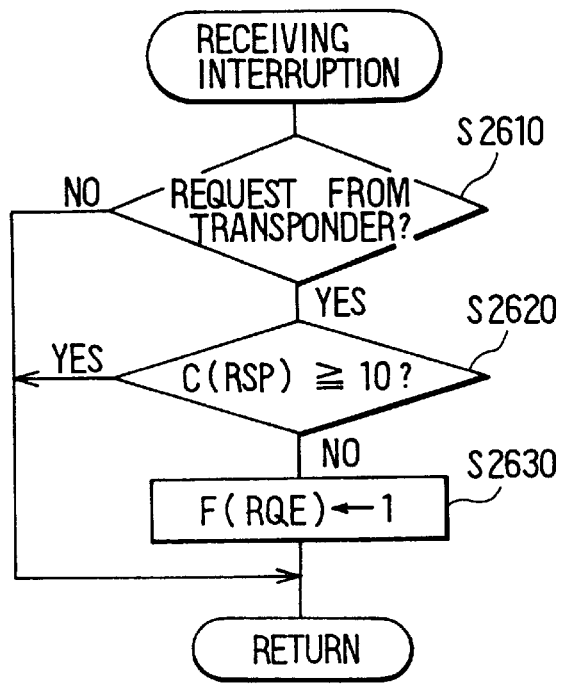
FIG. 17 is a flowchart showing a responding process executed by the engine ECU according to a second embodiment.
Figure 18:
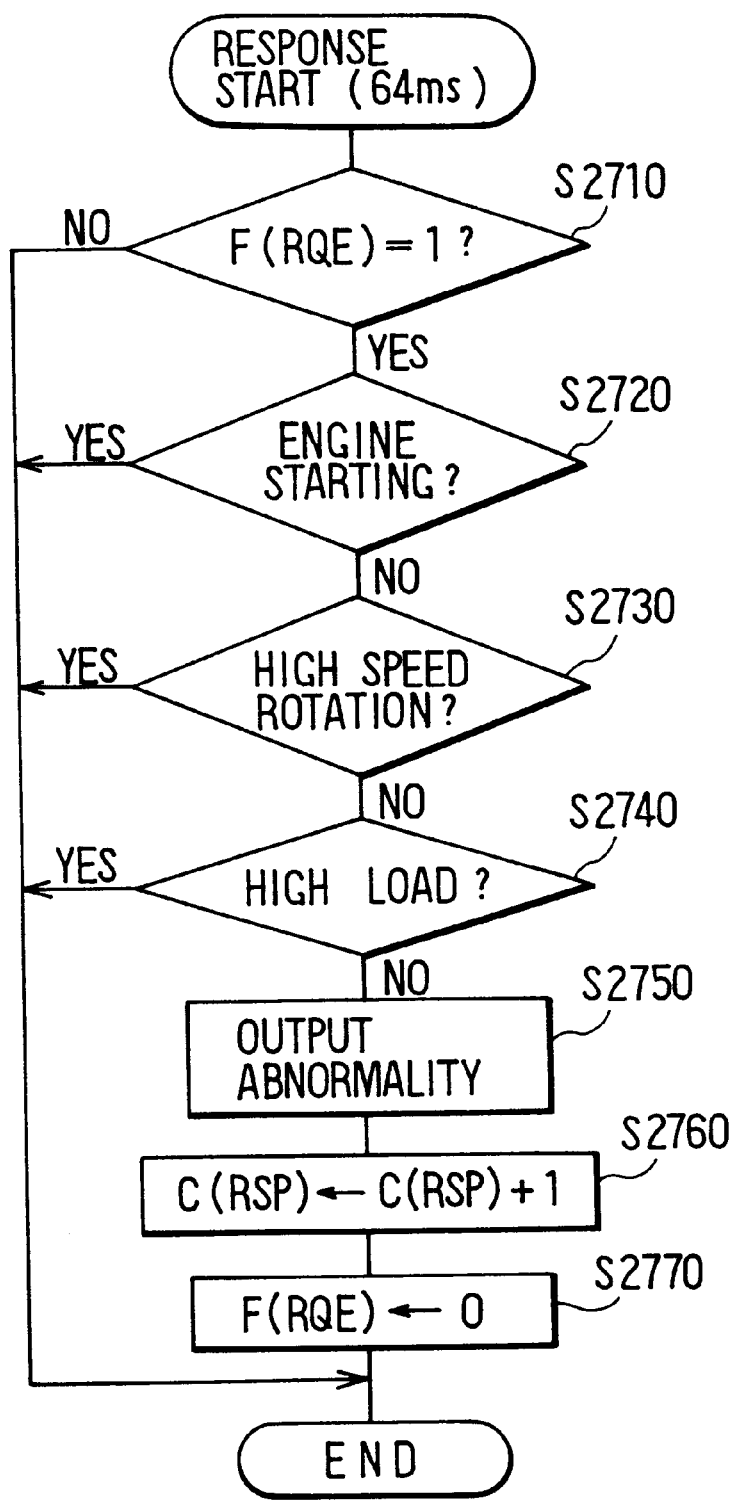
FIG. 18 is a flowchart showing a responding process executed by the engine ECU according to the second embodiment.

The second embodiment is different from the first embodiment with respect to a point that a responding process shown in FIGS. 17 and 18 is executed in place of the responding process shown in FIGS. 10 and 11 in the first embodiment.

That is, in the second embodiment, as shown in the flowchart of FIG. 17, when an output request is sent from the transponder 10 (YES at step S2610), the check (S620 to S640 in FIG. 10) to see whether or not it is in the inappropriate period in the first embodiment is not executed. When the response number counter C(RSP) is less than 10 (NO in S2620), the output request flag F(RQE) is set to "1" (S2630). Consequently, when there is the output request from the transponder 10 by the receiving interruption and only the condition of the response number of times is satisfied, the output request flag F(RQE) is set to "1". As a result, as shown in FIG. 18, YES is always determined in the first step S2710 in a periodic process (a base process executed, for instance, every 64 m/sec). In the following steps S2720 to S2740, whether it is in the first or second inappropriate period or not is checked. When it is not in the first and second inappropriate periods (NO in S2720 to S2740), the abnormality information is outputted to the transponder 10 (S2750).

That is, in the process by the receiving interruption in FIG. 17, the check to see whether it is in the first or second inappropriate period or not is not made but the output request itself is always stored. In the responding process of FIG. 18 carried out periodically, even if it is in the first or second inappropriate period, the abnormality information is outputted to the transponder 10 when the state becomes appropriate.

In this manner, the response to the output request is improved. In the case where it is in the inappropriate period or not is checked when the output request is received and the output request is not responded during the inappropriate period and is responded if it is not during the inappropriate period as in the first embodiment, even if the inappropriate period is over, the responding operation has to wait for the next timing of the output request. That is, the output request does not always come by the receiving interruption just after the inappropriate period. On the contrary, in case of the second embodiment, the output request itself by the receiving interruption is stored and responded when it is not in the first and second inappropriate periods. That is, the output request can be responded immediately after the state becomes appropriate, so that the response to the output request is improved.

Although the first and second inappropriate periods are set in the foregoing embodiments, either one of the inappropriate periods can be also set according to a system configuration.

The present invention should not be limited to the disclosed embodiments, but may be implemented in other ways without departing from the spirit of the invention.

What is claimed is:

1. A diagnostic apparatus for a vehicle which communicates with a management center provided away from the vehicle, comprising:

a control unit for controlling various devices mounted on a vehicle and diagnosing conditions of the various devices; and a communication unit which is connected to the control unit via a communication line and transmits a result of diagnosis by the control unit to the management center, wherein the control unit is programmed to discriminate at least one of a first inappropriate period in which noises are supposed to occur on the communication line due to engine starting and a second inappropriate period in which a process load required to control the various devices is supposed to be larger than a predetermined value, the control unit is programmed to disable a response thereof to the communication unit during the inappropriate period, even if there is a request for outputting the diagnosis result to the communication unit.

2. An apparatus according to claim 1, wherein the communication unit is programmed to request the control unit to output the diagnosis result in response to a transmission request from the management center.

3. An apparatus according to claim 2, wherein the control unit is programmed to ignore the output request but store the output request and, thereafter output the diagnosis result to the communication unit in response to the stored output request for the diagnosis result, when the state becomes appropriate.

4. An apparatus according to claim 1, wherein the communication unit is programmed to periodically send an output request to the control unit until outputting of the diagnosis result from the control unit is confirmed.

5. An apparatus according to claim 2, wherein the communication unit is programmed to repeatedly send an output request to the control unit until the diagnosis result is outputted from the control unit a plurality of times and the contents of the diagnosis results of the plurality of times coincide with each other and the communication unit is programmed to transmit the coincided diagnosis result to the management center, when the diagnosis results coincide with each other.

6. An apparatus according to claim 2, wherein when an output request for the diagnosis result is received although the diagnosis result has been outputted in excess of a predetermined number of times in response to the output requests from the communication unit, the control unit is programmed not respond to the output request after that.

7. An apparatus according to claim 1, wherein the control unit is programmed to request itself to output the diagnosis result at a predetermined timing for outputting the diagnosis result.

8. An apparatus according to claim 1, wherein the communication unit includes identification information specific to the vehicle in the result of the diagnosis of the vehicle transmitted to the management center.

9. An apparatus according to claim 1, wherein the communication unit includes at least one of a travel distance of the vehicle and a vehicle position at the time of diagnosis in the result of the diagnosis of the vehicle transmitted to the management center side.

10. An apparatus according to claim 1, wherein the control unit is programmed to control at least an engine.

11. A diagnostic method between a vehicle having a control unit and a management center provided away from the vehicle, the control unit being programmed to control various vehicle-mounted devices and to diagnose various operations, comprising the steps of:

detecting at least one of a first inappropriate period in which an engine is in a starting operation and a second inappropriate period in which the control unit is in a predetermined busy control processing operation for the vehicle-mounted devices; and disabling a response from the control unit to the management center, during the detected inappropriate period, with respect to a request for outputting a diagnosis result of the control unit.

12. A method according to claim 11, further comprising the steps of:

storing the request during the inappropriate period; and outputting the diagnosis result from the control unit in response to the stored request for the diagnosis result, after the inappropriate period.

13. A method according to claim 12, further comprising the step of:

sending periodically the request to the control unit until the diagnosis result is outputted from the control unit.

14. A method according to claim 11, further comprising the steps of:

counting the number of times the diagnosis result is outputted; and disabling outputting the diagnosis result from the control unit when the counted number reaches a predetermined number.

* * * * *